Jan. 6, 1948.    J. C. LANG    2,433,914
STAPLE STRIP AND STAPLE
Filed April 28, 1944    2 Sheets-Sheet 1

INVENTOR
Joseph C. Lang
by his attorneys
Christy, Parmelee Strickland

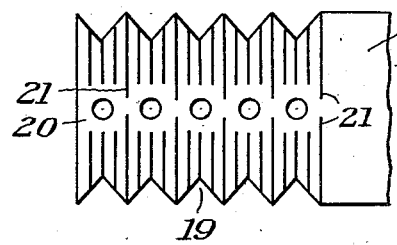
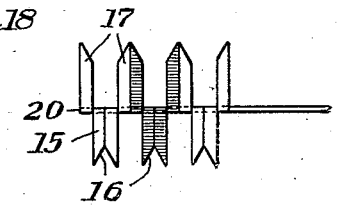
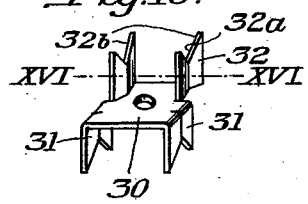
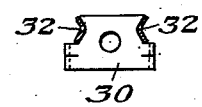
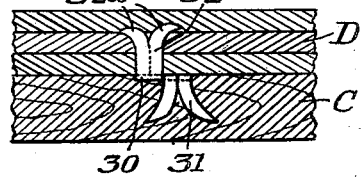
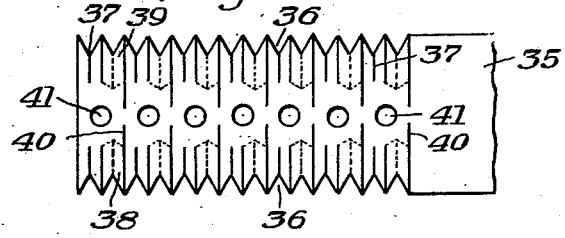
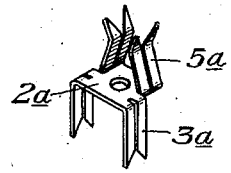
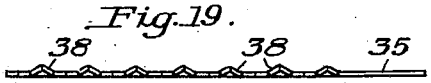

Patented Jan. 6, 1948

2,433,914

UNITED STATES PATENT OFFICE 2,433,914

STAPLE STRIP AND STAPLE

Joseph C. Lang, Pittsburgh, Pa., assignor to Bocjl Corporation, Pittsburgh, Pa., a corporation of Delaware Application April 28, 1944, Serial No. 533,157

19 Claims. (Cl. 59—77)

This invention relates to the art of stapling and is for a staple or staple strip especially designed to secure together two pieces of material in face-to-face relation.

In various places, as for instance in the construction of building or other panels, a sheet of plywood, composition board, or plaster board, must be secured to wooden framework or studs. Nails are not satisfactory, first because the nails must be driven through the sheet material into the studding, so that the heads of the nails are visible, or the heads must be driven in or countersunk and thereafter covered with plastic to conceal them. If the head of the nail used for this purpose is large, it cannot be driven into the plaster board to countersink it to a satisfactory extent, and if small headed nails are used, they will pull through the sheet material, particularly in the case of composition board, and have insufficient holding power. Moreover, where nails are used and the holes above the nails subsequently filled with putty or other filler, dust rings will inevitably form on the surface of the fiber board, or any covering put over it, or any coating of paint put on it after the structure has been in use for some time, vibration probably largely accounting for the presence of said dust rings.

The present invention provides for use in this and like fields of usefulness a "blind" fastener, i. e., one which is not visible or exposed on either surface of the structure, and one which develops even in soft fiber board or plaster board a very substantial holding power. This is accomplished through the use of a staple having prongs which extend in two directions from a common plane, one set of prongs being especially developed to be effectively driven and have substantial holding power in wood, the other set of prongs, extending in the opposite direction, being designed to especially meet the conditions necessary for holding the panel or composition board to the wood. The fastener contemplated by the present invention is of a type which permits the fastener to first be driven into the wood constituting the studding or frame to which overlying material is to be secured. Then the overlying material, such as a panel of plywood, composition board, or even another wooden strip, is pressed forcibly against the projecting prongs of the fasteners which have been so driven, and the reversely projecting prongs thereon will effectively engage in the material so pressed on and secure it in place. In first applying the fasteners or staples to a wooden structure, the staple or fastener must be driven by a suitable implement wherein the legs of the staple which penetrate the wood are guided to prevent them from collapsing. Hence the fastener of the present invention is designed to be guided in a staple guide of an appropriate driver. The prongs which enter the panel or material to be applied over the wooden framework penetrate the material without any driver or implement being used, hence they are so disposed that they will not interfere with the first mentioned prongs being properly guided.

In some cases, the staples will be completely formed before they are driven. In other cases the driving apparatus will employ a strip which has been properly cut to define successive individual staples or fasteners, but the final forming of the staple will take place in the operation of driving. My invention is intended to cover either method of driving.

My invention may be more fully understood by reference to the accompanying drawings which illustrate certain embodiments of my invention, and in which:

Fig. 12 is a plan view of the staple strip for making the staple shown in Fig. 11;

Fig. 13 shows a connected staple strip made from the strip of Fig. 12, one of the staple forms being shaded for the purpose of more clearly showing the contours of the individual staples produced from the strip, these staples of course corresponding to the staples of Fig. 11;

Fig. 14 is a further modification illustrating a staple strip in which the individual staples have two pairs of upwardly extending legs at each edge thereof or a total of eight individual leg elements extending upwardly therefrom, the shading illustrating the manner of separation of the strip into individual staples;

Fig. 15 is a perspective view of another modification adapted especially for use in securing hard plywood to studding;

Fig. 16 is a transverse horizontal section in the plane of line 16—16 of Fig. 15;

Fig. 17 is a view similar to Fig. 6 showing the manner in which the modified staple of Fig. 15 engages the material;

Fig. 18 is a plan view of a staple strip from which the staple of Fig. 15 is developed;

Fig. 19 is an edge view of the strip shown in Fig. 18; and

Fig. 20 is a perspective view of a staple similar to that shown in Fig. 4, but wherein the curvature of the legs is reversed.

Figure 1:
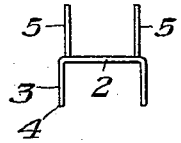
Fig. 1 is an end elevation of a staple embodying the invention.
Figure 2:
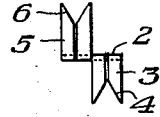
Fig. 2 is a side elevation of the staple shown in Fig. 1.
Figure 3:
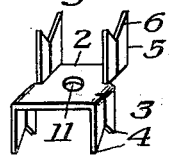
Fig. 3 is a perspective view of the same staple.

Referring first to Figs. 1 to 3, inclusive, the embodiment of staple-like fasteners therein disclosed is formed from sheet metal. It has a flat bridge portion 2. Assuming the bridge portion to be horizontal, there are two downwardly turned legs 3 at each side of the bridge. These legs have divergently cut points or terminals 4, the two closely spaced legs with the divergent points forming in effect a bifurcated fish-tailed prong. Two other pairs of legs 5 extend upwardly from the opposite edges of the bridge or body 2, the legs 5 being offset laterally with respect to the lower ones and they, too, have divergently beveled ends 6, the two legs with such ends forming bifurcated upwardly extending fish-tailed prongs or prong-like projections. The distance crosswise between the upper legs is less than the distance between the two pairs of lower legs.

Figure 4:
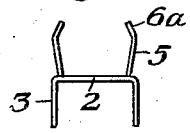
Fig. 4 is a view of of a slightly modified form of staple of the type shown in Figs. 1, 2 and 3.

While the upwardly extending legs 5 may in many cases be straight, as shown in Fig. 2, they may have a slight outward spread from the base towards the ends, as shown in Fig. 4, the angle of the legs being about 8° outwardly from a vertical plane. The extreme tip portions are then preferably toed in at an angle of the order of twenty-five degrees, the turned-in tip portions being designated 6a in Fig. 4. This toeing in of the legs is especially useful where the material to be engaged by these legs is a pulp, fiber or like relatively soft material, whereas for harder materials, the legs are preferably straight.

In use, the legs 3 are driven into wood, or other dense material, as for example wooden studs or frame work. The staples are driven with a driver comparable generally to a staple driver, so that the legs 3 must be guided in guideways or channels, and the legs 5 are set inwardly from the legs 3 a distance at least equal to the depth of the staple guides, and if this were not so the legs could not be satisfactorily guided. In being driven, a sharp blow is used sufficient to normally sink the body 2 into the surface of the studs.

Figure 5:
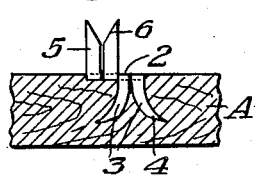
Fig. 5 shows the staple of either Fig. 1 or 4 after it has been driven into a studding or frame, or other substance into which it is first driven.

The condition of the staple upon being driven is shown in Fig. 5. By reason of the fish-tail shape of the terminal of the legs, the legs 3 spread apart. In Fig. 5, A designates wood, such as a stud. As shown in Fig. 5, the body or bridge 2 is sunk into the wood to be flush therewith, and the legs 5 project outwardly or upwardly.

Figure 6:
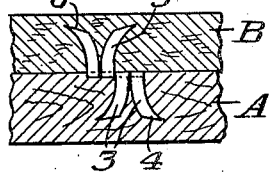
Fig. 6 is a view illustrating the manner in which the staple engages both sheets of material and in which it is driven, the view being generally a longitudinal section with the staple shown in side elevation.
Figure 7:
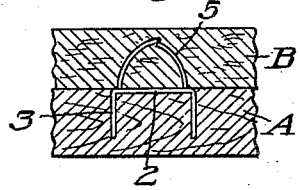
Fig. 7 is a view corresponding to Fig. 6, but showing the same staple in front elevation.
Figures 8, 9:
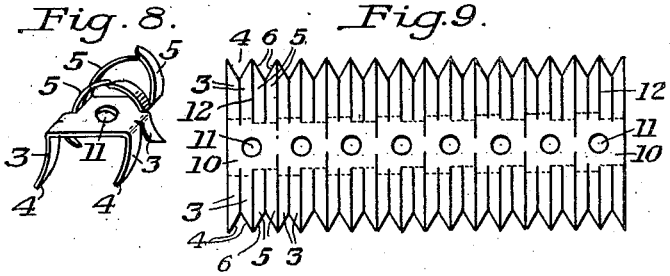
Fig. 8 is a perspective view showing the staple of Fig. 7 removed from the two materials in which it has been driven.
Fig. 9 is a plan view of a staple strip from which the staples of Fig. 1 or 4 are formed.

When a panel B (Figs. 6 and 7) is then pressed against the legs 5 and the legs 5 penetrate the panel, especially if the panel be relatively soft, they will spread apart, as shown in Fig. 6 and at the same time curl or turn inwardly as shown in Fig. 7. If the panel B is a fiber or pulp or other relatively soft composition, the legs must be given some initial bending, such as shown in Fig. 4 to assure the shape described. Fig. 8 shows in perspective the shape of a staple which has been driven in this manner and then cut out of the substances into which it is driven. The diverging of the legs 5 at each side of the staple while turning in toward the corresponding leg at the other side of the staple develops a powerful holding ability, and in many cases the substance of the panel B clutched in the legs so bent will pull away from the mass of the panel before the staple will give way. The inward offsetting of the upwardly extending legs has the further advantage of facilitating nesting of one row of staples into another where it is desirable to so arrange them because the upwardly extending legs of one staple can fit between the downwardly extending legs of one placed above it.

The equipment for driving the staples forms no part of the present invention, and has not been disclosed. However, such equipment may be designed to use either individual staples as illustrated in Figs. 1 and 2, or it may use a flat preformed strip shown in Fig. 9, the bending of the legs of the staple being accomplished in advancing the staple strip through the machine as is well understood by those skilled in the art. In either event, whether the staples are driven as individual units, or whether they are severed from a strip in the operation of driving, they are blanked from a strip of flat sheet metal as illustrated in Fig. 9, wherein the central portion of the strip is a continuous body 10 having a succession of holes 11 therein, these holes being regularly spaced and providing indexing means for feeding the strip, and a large hole is in many instances desirable, even considerably larger than that illustrated, for reducing the resistance to the driving of the flat body of the staple flush into the surface of the wood. The strip is slit from the edges toward the center, all of the slits, except each fourth one, conveniently being of the same length, and the outer edges of the strip are serrated to form in the finished staple the fish-tail end portions previously described. The slits are designated 12, and extend inwardly from both the peaks and the valleys of the serrations. The lines on which the respective pairs of legs are bent up or down as the case may be, are indicated by dotted lines, the two pairs of legs of each staple-forming unit which extend down, and which are designated 3, being bent downwardly on a line further out from the center of the strip than the legs designated 5 which are bent upwardly, this difference in the line of bending accounting for the difference in the widths between the downwardly extending legs on the one hand and the upwardly extending ones on the other. The increased length of every fourth slit is to facilitate separation of the successive staple units.

Figure 10:
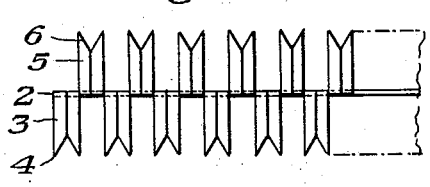
Fig. 10 is a side elevation of a staple strip such as shown in Fig. 9, but in which the respective pairs of legs have been bent up or down.

In some cases, the strip shown in Fig. 9 will be bent to have the respective legs turned up and down, but the individual staples will not be separated until they are separated in the driving machine. In this case the strip of Fig. 9 may be formed into a staple strip as shown in Fig. 10, the same reference numerals being used to designate in Fig. 10 the corresponding parts.

Figure 11:
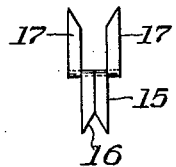
Fig. 11 is a side elevation of a modified form of staple in which the downwardly extending legs are separated.

Referring now to Figs. 11, 12 and 13, Fig. 11 shows a side elevation of a slightly modified form of staple in which the two downwardly turned legs, designated 15, are closer together and are separated only by a narrow slit or kerf, the ends terminating in a fish-tailed recess 16. These two legs are blanked or turned down from between the upwardly extending legs which are designated 17. Consequently the two legs 17 at each edge of the staple are spaced apart a distance equal to the joint width of the legs 15. However, they have divergently turned legs similar to the fish-tailed legs 15 and similar to the upwardly extending legs similar to those shown in Figs. 1–3. The advantage of this type over the arrangement shown in Figs. 1 to 3 is that it gives wider separation of the upwardly extending legs and therefore when the staple is engaged in a very soft piece of wall board, the hold of the staple is distributed over a greater area so that the tendency of the soft material to tear out from the body of the wall board is reduced. The holding power of the staple is also increased because of the legs being at more widely separated points. However, the overall length of the staple is no greater than that shown in Fig. 2.

The staple of Fig. 11 is formed from a strip as illustrated in Fig. 12. In Fig. 12, 18 shows the flat ribbon which is initially used to form the staples. The edges of the ribbon are serrated as indicated at 19, these serrations being double the width and depth of the serrations of Fig. 9, so that there are a total of four leg elements of the strip in each serration. The central portion of the strip is designated 20 and every fourth slit 21, defining a line of separation, goes closer in toward the center than any of the other three slits of each staple unit. This is done merely for the purpose of making it easier to shear or separate each staple unit from the strip. The legs are bent so that the upwardly extending legs are separated crosswise of the staple a distance less than the downwardly extending legs, whereby the condition shown in Fig. 1 also prevails with the staple shown in Fig. 11. Fig. 13 illustrates the bending of the legs up and down from the serrated strip shown in Fig. 12, the shading being provided for the purpose of clearly defining the separate staple units in the strip. The reference numerals of course correspond to Figs. 11 and 12. There is another advantage in this form of staple, in that the die for cutting the serrated edges is more simple and easier to maintain in good cutting order. This is due to the fact that there are only half as many serrations in the die than is required in the die for cutting the staple strip shown in Fig. 9, and the serration forming portions on the die are twice as large.

Fig. 14 shows a modified way of bending a strip as shown in Fig. 9 so as to provide a staple with two pairs of upwardly extending legs and one pair of downwardly extending legs on each edge of the staple. In this view, there is illustrated a staple strip having pairs of upwardly extending legs 25 and pairs of downwardly extending legs 26. The shading indicates the separation of the strip into individual staple units, and each staple unit has two upwardly extending pairs of legs along each edge and one downwardly extending pair, the downwardly extending pair being intermediate the two upwardly extending pairs. This staple combines the arrangements of Figs. 1 and 13 to give even added holding power for the upward part of the staple where it is entered in very soft material.

Sometimes it is desirable to secure hard wood to studding in the manner herein indicated. For example, sheets of hard plywood may be secured to studding. The upwardly extending staples in the forms previously described are especially designed to turn over rather easily in penetrating soft material, and hence there would be a likelihood of their mashing down if they were used with hard wood. Where hard wood is to be secured to the studding, the downwardly extending legs are of the form previously described and are illustrated in Figs. 15 to 19 inclusive. In these figures, the staple has a bridge or body portion 30 with downwardly extending legs 31 at each edge thereof, the legs 31 being in pairs with each pair terminating in a fish-tail. The two pairs of legs, as previously indicated, form in effect a downwardly extending bifurcated prong with a fish-tail end. The upwardly extending legs 32 are in the form of single upwardly extending prongs with a fish-tailed terminal, these prongs being equal in width to two of the downwardly extending legs, and they are, as shown in Fig. 16, bent inwardly to form longitudinally extending troughs or concavities in the outer surface of the legs, the inner surface of course being convex. This imparts great rigidity to the legs so that they can penetrate hard fiber board or plywood or other wood without being engaged in a driver and without collapsing or folding down.

This staple is used in the manner hereinbefore indicated, the legs 31 being driven into the studding and the prongs 32 projecting inwardly. In Fig. 17, C designates the studding and D designates a layer of hard plywood which is pressed against the studding. In pressing the plywood onto the studding, the prongs 32 penetrate the plywood and the fish-tailed terminal portions 32a therefore spread apart and deflect to increase the holding power of the staple, but otherwise the legs or prongs 32 are not deformed. This form of leg has considerable surface area so that, when engaged in plywood, it will have considerably more friction holding power than would an ordinary nail having the same amount of metal embedded in the wood. The trough shape of the legs, in addition to forming stiffening means, also increases the frictional engagement of the prongs in the wood.

Figs. 18 and 19 illustrate the manner in which the staple of Fig. 15 may be formed from a ribbon of metal, and as previously indicated, the staples may be fed to the driver as a ribbon, or as a series of connected units, or as individual units. In Fig. 18 the original ribbon is designated 35. The edges are serrated as indicated at 36; extending inwardly from each alternate valley in the serrated edge there is a slit 37. The portion of metal adjacent the intervening valleys is pressed to the trough-shaped form previously described, these bent out or trough-like portions being designated 38. From the peak of every alternate serration there is an inwardly extending slit 40 which is longer than the slit 37 to define the line of separation of each staple unit and the holes 41 provide means for indexing the strip in feeding it through a forming or driving device.

When the metal is pressed out as indicated at 38, the fish-tailed end formed by the serration is likewise deformed so that the edges 32b of the fish-tailed surfaces of the prongs are in non-parallel planes, and this is of definite advantage in causing the end of the staple to deform in the plywood.

While Fig. 4 shows the outward sloping of the legs with the inward toeing of the end portions, it will be understood, as previously indicated, that this same shape may be imparted to the upwardly extending legs of any of the other forms of staples herein described, especially the forms shown in Figs. 11 and 14. It would be less desirable to use any such deformation of the legs of the staple of Fig. 15 although in certain instances it might be done. Also, in certain instances the prongs 32 may be slit part way toward the base of the prongs from the valley of the fish-tail without being slit the full length.

In the modification shown in Fig. 20, the downwardly extending legs of the staple are designated 3a and the upwardly extending legs are designated 5a, and the bridge or body portion of the staple is designated 2a. As shown, the upwardly extending legs slope inwardly at an angle of approximately 8° from a vertical plane, and then they are toed outwardly at an angle of approximately 25°, this being the reverse of the arrangement shown in Fig. 4. When the upwardly extending legs are pressed into wall board or other soft material, they will tend to spread apart both longitudinally and transversely of the staple, distributing the holding power of the staple over considerably greater area, and this may be desirable in especially soft material, or as an alternative for the arrangement shown in Fig. 4. It will be understood that the curvature of the legs shown in Fig. 20 may be applied to any of the other forms of staple (other than Fig. 4) herein described.

As has been previously pointed out, the downwardly extending legs are spaced further apart crosswise of the staple than the upwardly extending legs, in order that these downwardly extending legs may be received in the channel-like grooves of a staple guiding machine. The outer face of the downwardly extending legs will be supported against the face of the channel while the two outer edges of the legs would be supported against the sides of the channel. Thus the legs, while being driven, cannot bow outwardly, nor can they, as long as they are in the staple guide, spread apart. The fish-tailed terminal portions, as they penetrate the wood, tend to spread the legs apart, thus preventing the legs from bending toward each other in the staple guide. As previously pointed out, after the legs begin to penetrate the wood, the angular cut of the terminals causes the legs to spread to develop a considerable holding power in the wood. Additionally, the downwardly extending legs are in edge-to-edge relation. This is desirable, but not necessary, as the two legs will be properly guided when the points are shaped in the manner shown, even though they may be spaced a greater distance from each other than shown in the drawings.

While I have illustrated and described certain particular embodiments of my invention, it will be understood that various changes and modifications may be made therein, and that different features appearing in the several modifications may, in many instances, be recombined or rearranged.

I claim:

1. A staple having a relatively thin body portion with a pair of downwardly extending leg elements on each of two opposed side edges thereof, the body having upwardly extending leg elements on the same side edges and located out of vertical alignment with the downwardly extending leg elements and closer together crosswise of the staple from one edge to the other, than the pairs of downwardly extending leg elements, the side edges of the body on which the legs are provided being parallel.

2. A staple having a relatively thin flat body portion with a pair of downwardly extending leg elements on each of two opposed side edges thereof, the two legs of each pair being in close edge-to-edge relation whereby each pair may be guided as a single leg in a driver, the body also having upwardly extending leg elements thereon on the same side edges as the first leg elements and set inwardly from the plane of the first leg elements, the terminals of the downwardly extending legs of each pair being divergently sloped to cause the legs to spread when they penetrate wood, the side edges of the body on which the legs are provided being parallel.

3. A staple having a relatively thin flat body portion with a pair of downwardly extending leg elements on each of two opposed edges thereof, the body also having upwardly extending leg elements thereon, the terminals of the downwardly extending legs of each pair being divergently sloped to cause the legs to spread when they penetrate wood, the upwardly extending leg elements being positioned on the same two edges of the body as the downwardly extending legs and being closer together crosswise of the body than the downwardly extending legs to enable each pair of downwardly extending legs to be received in a staple guide when the staple is being driven.

4. A staple having a relatively thin flat body portion with a pair of downwardly extending leg elements on each of two opposed edges thereof, the body also having upwardly extending leg elements thereon, the terminals of the downwardly extending leg of each pair being divergently sloped to cause the legs to spread when they penetrate wood, the upwardly extending legs being positioned on the same two edges of the body as the downwardly extending legs and being closer together crosswise of the body than the downwardly extending legs, said upwardly extending leg elements also having terminal portions providing divergently sloped edges.

5. A staple comprising a relatively thin body portion having two downwardly turned legs on each of two opposite edges thereof, the downwardly extending legs being in edge-to-edge relation to form in effect a bifurcated prong-like element, the body also having a pair of upwardly extending prong-like elements thereon, the upwardly extending prong-like elements being set inwardly with respect to the downwardly extending ones and being located to one side of the downwardly extending ones.

6. A staple of the class described comprising a relatively thin body portion having a pair of legs extending downwardly from each of two opposed edges thereof, the legs of each pair being in edge-to-edge relation to form a single bifurcated prong-like member, and a pair of upwardly extending legs on the body on each of two opposed edges thereof, the upwardly extending legs being sloped outwardly and upwardly with respect to a vertical plane and having the extreme terminal portions thereof toed inwardly.

7. A staple of the class described comprising a relatively thin body portion having bifurcated prong-like elements extending downwardly from each of two opposite edges thereof, the terminal portions of the prong-like elements being fish-tailed, the body also having on the same edges thereof upwardly extending fish-tailed prong-like elements.

8. A staple of the class described comprising a relatively thin body portion having bifurcated prong-like elements extending downwardly from each of two opposite edges thereof, the terminal portions of the prong-like elements being fish-tailed, the body also having on the same edges thereof upwardly extending fish-tailed prong-like elements, the upwardly extending prong-like elements being also bifurcated.

9. A staple of the class described having a relatively thin substantially flat body portion with a pair of downwardly extending legs on each of two opposite edges thereof, said legs of each pair being in edge-to-edge relation to form a bifurcated prong-like element, and pairs of upwardly extending legs on the same opposite edges of the body, the terminals of the downwardly extending legs being divergently beveled to cause the legs to spread apart when they are driven into the material, the terminals of the upwardly extending legs being also divergently beveled to cause them to spread apart when they are driven into a substance.

10. A staple of the class described having a relatively thin substantially flat body portion with a pair of downwardly extending legs on each of two opposite edges thereof, said legs of each pair being in edge-to-edge relation to form a bifurcated prong-like element, and pairs of upwardly extending legs on the same opposite edges of the body, the terminals of the downwardly extending legs being divergently beveled to cause the legs to spread apart when they are driven into the material, the terminals of the upwardly extending legs being also divergently beveled to cause them to spread apart when they are driven into a substance, the terminal portions of the upwardly extending legs being also toed inwardly.

11. A staple comprising a sheet metal body having a relatively thin pair of downwardly turned legs on each of two opposite edges thereof, the two legs of each pair being in edge-to-edge relation to form a bifurcated prong, the lower end of said bifurcated prong being fish-tailed, the staple also having a pair of upwardly extending fish-tailed prongs on two opposite edges thereof.

12. A staple comprising a relatively thin sheet metal body having a pair of downwardly turned legs on each of two opposite edges thereof, the two legs of each pair being in edge-to-edge relation to form a bifurcated prong, the lower end of said bifurcated prong being fish-tailed, the staple also having a pair of upwardly extending fish-tailed prongs on two opposite edges thereof, said upwardly extending legs being of trough-like transverse section.

13. A staple comprising a relatively thin sheet metal body having a pair of downwardly turned legs on each of two opposite edges thereof, the two legs of each pair being in edge-to-edge relation to form a bifurcated prong, the lower end of said bifurcated prong being fish-tailed, the staple also having a pair of upwardly extending fish-tailed prongs on two opposite edges thereof, said upwardly extending legs being of trough-like transverse section, the upwardly extending legs also having fish-tailed terminal portions.

14. A blank for forming a number of staple-like fasteners comprising a ribbon of metal having the two longitudinal edges thereof serrated and being transversely slit from the edge toward the center from the valley of each serration and from the peak of each serration.

15. A blank for forming a number of staple-like fasteners comprising a ribbon of metal having the two longitudinal edges thereof serrated and being transversely slit from the edge toward the center from the valley of each serration and from the peak of each serration, every fourth slit extending toward the center of the strip a distance greater than the remaining slits to define a line of separation.

16. A blank forming a connected series of staples comprising a ribbon of sheet metal having its longitudinal edges serrated and having transverse slits therein extending from the edges toward but not through the center of the strip whereby the center of the strip constitutes a continuous band of metal, certain corresponding portions of the slit edges at each side of the center strip projecting downwardly from the plane of the center to form leg elements, intervening corresponding edge portions extending in the reverse direction to provide upwardly extending leg elements, the serrations providing fish-tailed terminal portions for said downwardly and upwardly extending leg elements.

17. A blank for forming a number of staple-like fasteners comprising a ribbon of metal serrated along its longitudinal edges, and, at regular intervals being slit transversely from its edges toward but not to its center to define lines of separation, and at a plurality of places between said first slits being also slit from the edge toward the center to define leg portions, said second slits being of less length than the first, the strip having indexing holes therein at regular intervals, the holes being intermediate the first named slits.

18. A blank for forming a number of staple-like fasteners comprising a ribbon of metal having uniformly serrated longitudinal edges with slits extending inwardly from the points of the serrations to the center with the points of the serrations and the slits along the two edges being in transverse alignment, there also being slits extending inwardly from the valley of at least every other serration.

19. A blank for forming a number of staple-like fasteners comprising a ribbon of metal having uniformly serrated longitudinal edges with slits extending inwardly from the points of the serrations to the center with the points of the serrations and the slits along the two edges being in transverse alignment, there also being slits extending inwardly from the valley of at least every other serration, the strip having indexing holes at regular intervals along the center line thereof.

JOSEPH C. LANG.

REFERENCES CITED

The following references are of record in the file of this patent:

UNITED STATES PATENTS

| Number | Name | Date |
| --- | --- | --- |
| 705,626 | Vogel | July 29, 1902 |
| 826,125 | Steinmetz | July 17, 1906 |
| 1,995,173 | Ehle et al. | Mar. 19, 1935 |
| 2,208,848 | Jorgensen | July 23, 1940 |
| 2,117,308 | Frey | May 17, 1938 |
| 2,180,500 | Bernstein | Nov. 21, 1939 |
| 1,614,831 | Crofoot | Jan. 18, 1927 |
| 2,242,967 | Carlile | May 20, 1941 |

FOREIGN PATENTS

| Number | Country | Date |
| --- | --- | --- |
| 72,788 | Switzerland | Dec. 24, 1915 |
| 651,983 | France | Oct. 16, 1928 |
| 284,898 | Great Britain | Feb. 9, 1928 |